US008099363B1

(12) United States Patent
Kilchenstein, Jr.

(10) Patent No.: US 8,099,363 B1
(45) Date of Patent: Jan. 17, 2012

(54) METHODS AND SYSTEMS FOR PROCESSING CARD-NOT-PRESENT FINANCIAL TRANSACTIONS AS CARD-PRESENT FINANCIAL TRANSACTIONS

(75) Inventor: Michael W. Kilchenstein, Jr., Severna Park, MD (US)

(73) Assignee: Michael W. Kilchenstein, Jr., Severna Park, MD (US)

( * ) Notice: Subject to any disclaimer, the term of this patent is extended or adjusted under 35 U.S.C. 154(b) by 0 days.

(21) Appl. No.: 11/781,446

(22) Filed: Jul. 23, 2007

Related U.S. Application Data

(60) Provisional application No. 60/947,411, filed on Jun. 30, 2007.

(51) Int. Cl.
*G06Q 40/00* (2006.01)
(52) U.S. Cl. ............................... 705/44; 705/35; 705/39
(58) Field of Classification Search ................ 705/65, 705/44, 39, 1
See application file for complete search history.

(56) References Cited

U.S. PATENT DOCUMENTS

| | | | |
|---|---|---|---|
| 6,749,114 B2 | | 6/2004 | Madani |
| 7,415,443 B2* | | 8/2008 | Hobson et al. ................. 705/65 |
| 2008/0077526 A1* | | 3/2008 | Arumugam .................... 705/44 |
| 2008/0222030 A1* | | 9/2008 | Fischler ......................... 705/39 |
| 2009/0099961 A1* | | 4/2009 | Ogilvy ........................... 705/39 |
| 2009/0132273 A1* | | 5/2009 | Boesch ............................ 705/1 |

* cited by examiner

*Primary Examiner* — Samica L Norman
(74) *Attorney, Agent, or Firm* — Garrett IP, LLC

(57) ABSTRACT

Methods and systems for processing and facilitating the processing of payment card transactions between remote merchants and purchaser/card holders as authenticated card-present transactions, and for reducing processing fees charged to merchants. Purchaser/card holders are provided with payment card readers, and optionally, with biometric readers and/or personal identification number ("PIN") key pads. When a payment card transaction is to be conducted between a merchant and a purchaser/card holder, the purchaser/card holder is connected or redirected to a remote face-to-face ("RF2F") program/system. The RF2F program/system is configured to receive personal identification information from the purchaser/card holder, and optionally from the biometric reader and/or PIN key pad, and to authenticate the purchaser/card holder. The RF2F program/systemRF2F program/system/system is further configured to receive payment card information from the payment card reader, and to authenticate the payment card. The RF2F program/systemRF2F program/system/system is thus able to authenticate the payment card transaction as a card-present transaction. Accordingly, card processors and/or financial institutions, in cooperation with participating merchants and consumers, can reduce the number of fraudulent transactions occurring in the marketplace. RF2F payment card processing will reduce the cost of payment card related fraud as well as the processing fees charged to merchants. Methods and systems for rewarding merchants and purchaser/card holders are disclosed herein.

16 Claims, 5 Drawing Sheets

METHODS AND SYSTEMS FOR PROCESSING CARD-NOT-PRESENT FINANCIAL TRANSACTIONS AS CARD-PRESENT FINANCIAL TRANSACTIONS

CROSS REFERENCE TO RELATED APPLICATIONS

This patent application claims the benefit of U.S. Provisional Application Ser. No. 60/947,411, titled, "Methods and Systems for Processing Card-Not-Present Financial Transactions as Card-Present Financial Transactions," filed Jun. 30, 2007, which is incorporated herein by reference in its entirety.

FIELD OF THE INVENTION

Disclosed herein are methods and systems for processing card-not-present payment card transactions as card-present payment card transactions.

BACKGROUND

An Acquirer is an organization licensed as a member of Visa/MasterCard as an affiliated bank or bank/processor alliance that is in the business of processing payment card transactions and contracts with merchants for Visa/MasterCard acceptance and enables card payments from customers. Acquirers charge merchants for processing payment card transactions. Processing fees typically include discount fees and transaction fees. Discount fees are normally charged as a percentage of a transaction amount. Transaction fees are normally flat fees charged per transaction, typically in addition to the discount fees, though they can be translated into a percentage and bundled into the discount rate as well.

Discount and/or transaction fees (together referred to herein as "processing fees"), vary depending upon a variety of, often proprietary, criteria associated with card categories.

Card categories can include account-related categories, such as personal accounts and business accounts, and transaction-related categories, such as in person, or "card-present" transactions, and remote, or "card-not-present" transactions. Card-not-present transactions include transactions conducted by telephone, facsimile, over the Internet or other communication network, or by mail.

Processing fees typically reflect the perceived risk or potential fraud associated with the categories. For example, card-present transactions are considered less prone to fraud, and thus less risky, than card-not-present transactions. This is due, in part, to the ability to authenticate both the user and user's possession of the payment card. Accordingly, higher processing fees are charged for card-not-present financial transactions.

What is needed are methods and systems for reducing risk associated with remote or card-not-present financial transactions.

BRIEF SUMMARY OF THE INVENTION

The following summary of the invention provides an understanding of at least some aspects of the invention. The summary is not an extensive overview of the invention. It is not intended to identify key or critical elements of the invention nor is it intended to delineate the scope of the invention. Its sole purpose is to present some concepts of the invention in a simplified form as a prelude to the more detailed description that is presented later.

Methods and systems are disclosed for processing and facilitating the processing of payment card transactions between remote merchants and purchaser/card holders as in-person or card-present transactions, and for reducing processing fees charged to merchants.

Purchaser/card holders utilize card readers, e.g., magnetic stripe readers and or "smart" card readers and optionally, biometric readers and/or personal identification number ("PIN") key pads. When a payment card transaction is to be conducted between a merchant and a purchaser/card holder, the purchaser/card holder is connected or redirected to a Remote Face-to-Face ("RF2F") program and/or system (hereinafter, "program/system"). The RF2F program/system is configured to receive personal identification information from the purchaser/card holder, and optionally from the biometric reader and/or PIN key pad, and to authenticate the purchaser/card holder. The RF2F program/system is also configured to receive payment card information from the card reader, and to authenticate the payment card. The RF2F program/system is thus able to authenticate the payment card transaction as a card-present transaction. Accordingly, the processing fees charged to merchants will be commensurate with processing fees charged for card-present transactions.

Methods and systems for rewarding merchants and purchaser/card holders are disclosed herein.

Further embodiments, features, and advantages of the present invention, as well as the structure and operation of the various embodiments of the present invention, are described in detail below with reference to the accompanying drawings. These aspects are indicative of but a few of the various ways in which the principles of the invention may be employed, and the present invention is intended to include all such aspects and their equivalents. Further features and advantages will be apparent to a person skilled in the art based on the description set forth herein and/or may be learned by practice of the invention.

It is to be understood that both the foregoing summary and the following detailed description are exemplary and explanatory and are intended to provide further explanation of embodiments of the invention as claimed.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION

1. Introduction

Disclosed herein are methods and systems for processing payment card transactions between remote payors and payees, as card-present financial transactions.

As used herein, the phrase, "payment card transaction," refers to an electronic financial transaction that involves a card having information stored or imbedded on and/or within the card, such as in a magnetic strip, an embedded memory device ("chip"), or the like, which data can be read by an electronic and/or optical card reader. Such cards include, for example and without limitation, credit cards, check cards, debit cards, smart cards, consolidation cards, electronic checks, and/or an Automated Clearing House ("ACH") transactions.

As used herein, the phrase, "consolidation card," refers to a card or device that facilitates access to, or use of, one or more financial accounts through a user interface at a point of sale, face-to-face, or remotely, such as over the Internet or a telephone transaction. A consolidation card can provide access to, without limitation, one or more of, but is not limited to, credit cards, check cards, checking accounts, savings accounts, investment accounts, and equity accounts.

As used herein, the phrase, "remote face-to-face program/system," or "RF2F program/system," refers to a service offering of a card processor and/or an authorized processing service reseller and/or financial institution, alone and or in combination with one another and/or in combination with one or more merchants, in which merchants and purchasers/card holders enroll and are provided with services for processing, or facilitating the processing, of remote payment card transactions between the merchants and the purchasers/card holders, as card-present, authenticated financial transactions.

2. Exemplary System and Methods

Figure 1:
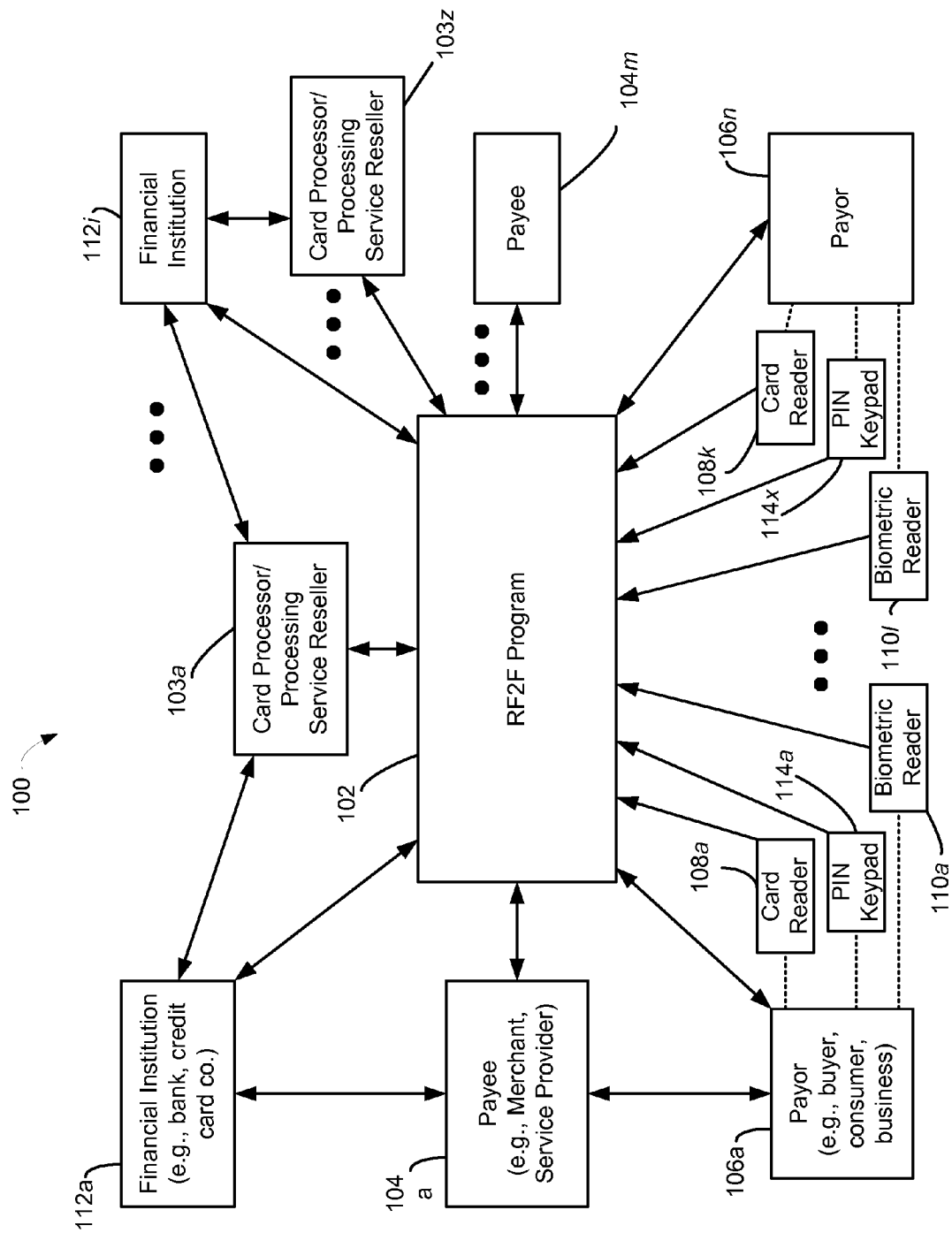
FIG. 1 is a block diagram of an exemplary card processing environment 100, including a card processor or authorized processing service reseller 102 that processes and/or facilitates card-not-present financial transactions as card-present financial transactions.

FIG. 1 is block diagram of an exemplary payment card processing environment 100, including an RF2F program/system 102 that processes and/or facilitates processing of payment card transactions between one or more payees 104 and one or more payors 106. Payees 104 can include, for example and without limitation, merchants and service providers. Payors 106 can include, for example and without limitation, buyers of goods and/or services, including end-user or consumers, and/or other businesses.

RF2F program/system 102 or portions thereof, can include, without limitation, one or more of an individual, a computer, computer peripherals, an office or home, communication equipments, policies, procedures, business methods, and combinations thereof. RF2F program/system 102 or portions thereof, can be implemented with hardware, software, firmware, manually, and/or combinations thereof, as a whollyautomated system, a partially automated system, or a manual system.

RF2F program/system 102 can be implemented within or by a conventional card processor and/or processing service reseller 103 (together referred to herein as a "card processor 103"), that processes payment card transactions. Alternatively, or additionally, RF2F program/system 102 can be implemented as a stand-alone entity or program, and/or integrated, in whole or in part, within one or more financial institutions 112 and/or payees 104.

Payees 104 and payors 106 are remote from one another, in that payees 104 are not face to face with the payors 106 and are unable to receive information from payment cards in the possession of payors 106 via conventional face to face methods such as, but not limited to, swiping the payor's 106 card through a magnetic stripe reader or manual card data entry at the payee 104 location, and/or do not have an ability to authenticate payees 106 as authorized users of the payment cards.

RF2F program/system 102 receives payment card information from one or more card readers 108, located physically proximate to payor(s) 106, and interfaces with payee(s) 104, financial institution(s) 112, and/or card processor(s) 103 to authenticate payor(s) 106 and the card information. As a result, RF2F program/system 102 processes and/or facilitates the processing of payment card transactions between payee(s) 104 and payor(s) 106 as card-present transactions.

Card readers 108 facilitate swiped, card-present transactions. Card readers 108 can be stand-alone card readers 108 that communicate card information directly to RF2F program/system 102, or can be coupled to a computer associated with a corresponding payor 106, wherein card swipe information is provided to RF2F program/system 102 via the computers associated with payor 106.

One or more optional biometric readers 110 are located physically proximate to one or more payors 106. Biometric readers 110 can be stand-alone biometric readers or can be coupled to a computer associated with corresponding payees 106, as described above with respect to card readers 108. Biometric readers 110 can include, without limitation, a fingerprint scanner, an eye scanner, an imaging device, such as a still camera or video camera, a speech recorder, and/or other biometric measuring and/or recording devices.

One or more personal identification number ("PIN") keypads 114 may be located physically proximate to one or more payors 106. PIN keypads 114 can be stand-alone PIN keypads or can be coupled to a computer associated with corresponding payees 106, as described above with respect to card readers 108. PIN keypads 114 can include encryption hardware and/or software.

PIN keypads 114, can be used for one or more types of payment card transactions, including, without limitation, debit and/or check card transactions. A PIN keypad 114 can be used in combination with one or more application programs running on a computer at payor 106. This is particularly useful for debit card transactions because PIN-based debit processing fees tend to be significantly lower than credit card processing fees.

Card readers 108, biometric readers 110, and/or PIN keypads 114 are optionally provided by RF2F program/system 102, payees 104, card processor 103, financial institutions 112, and/or distributors associated therewith. Incentives for providing readers to payors 106 include reduced security risks and corresponding processing fee reductions. Alternatively, card readers 108, biometric readers 110, and/or PIN keypads 114 are obtained by payors 106 from one or more other sources.

Communication links illustrated in FIG. 1, between RF2F program/system 102, card processor 103, payees 104, payors 106, card readers 108, biometric readers 110, PIN keypads 114, and financial institutions 112, can include, for example and without limitation, one or more of cable, telephone, wireless, coupled directly or through a network, such as the Internet and/or proprietary networks, as well as conventional physical delivery, and/or combinations thereof. One or more conventional security and/or encryption features can be implemented as part of the communication links.

One or more financial institutions 112, card processors 103, and/or payees 104 may impose rules, requirements, and/or restrictions on card-based financial transactions in order to treat the transactions as card-present transactions, rather than card-not-present transactions. RF2F program/system 102 is configurable, and optionally dynamically configurable to comply with and/or accommodate such rules, requirements, and/or restrictions.

In the example of FIG. 1, RF2F program/system 102 is illustrated to interface with multiple payees 104, payors 106, card processors 103, and financial institutions 112. This provides a variety of advantages, such as economies of scale and outsourcing of card processing tasks, such a management of data. A RF2F program/system 102 that coordinates with a number of payees 104, tends to process a greater number of transactions and/or a greater overall value of transactions than an individual payee 104. As such, RF2F program/system 102 will generally be in a stronger position, relative to a typical single payee 104, to negotiate reduced processing fees charged to payees 104 by financial institutions 112.

In operation, when a payor 106 and a payee 104 agree or determine to conduct a payment card transaction, RF2F program/system 102 is notified or activated to intervene and receive information from a card reader 108 that is proximate to payor 106. RF2F program/system 102 also authenticates payor 106 as an authorized user of the payment card. Authentication can include, without limitation, receiving from payor 106 personal identification information, such a personal identification number, or PIN, a password, an electronic key or other electronic file (e.g., picture or video), electronic signature, biometric information and/or a combination thereof. When RF2F program/system 102 conducts and/or facilitates a payment card transaction, card processor 103 and/or a corresponding financial institution 112 is notified of the transaction, and notified that the transaction constitutes a card-present financial transaction, with user authentication. The financial institution 112 can then debit, credit, or otherwise account for the payment card transaction. The RF2F program/system 102, card processor 103, and/or financial institution charge the payee 104 a card-present processing fee. Additional exemplary operation is described below with respect to FIGS. 2, 3, and 4.

Figure 2A:
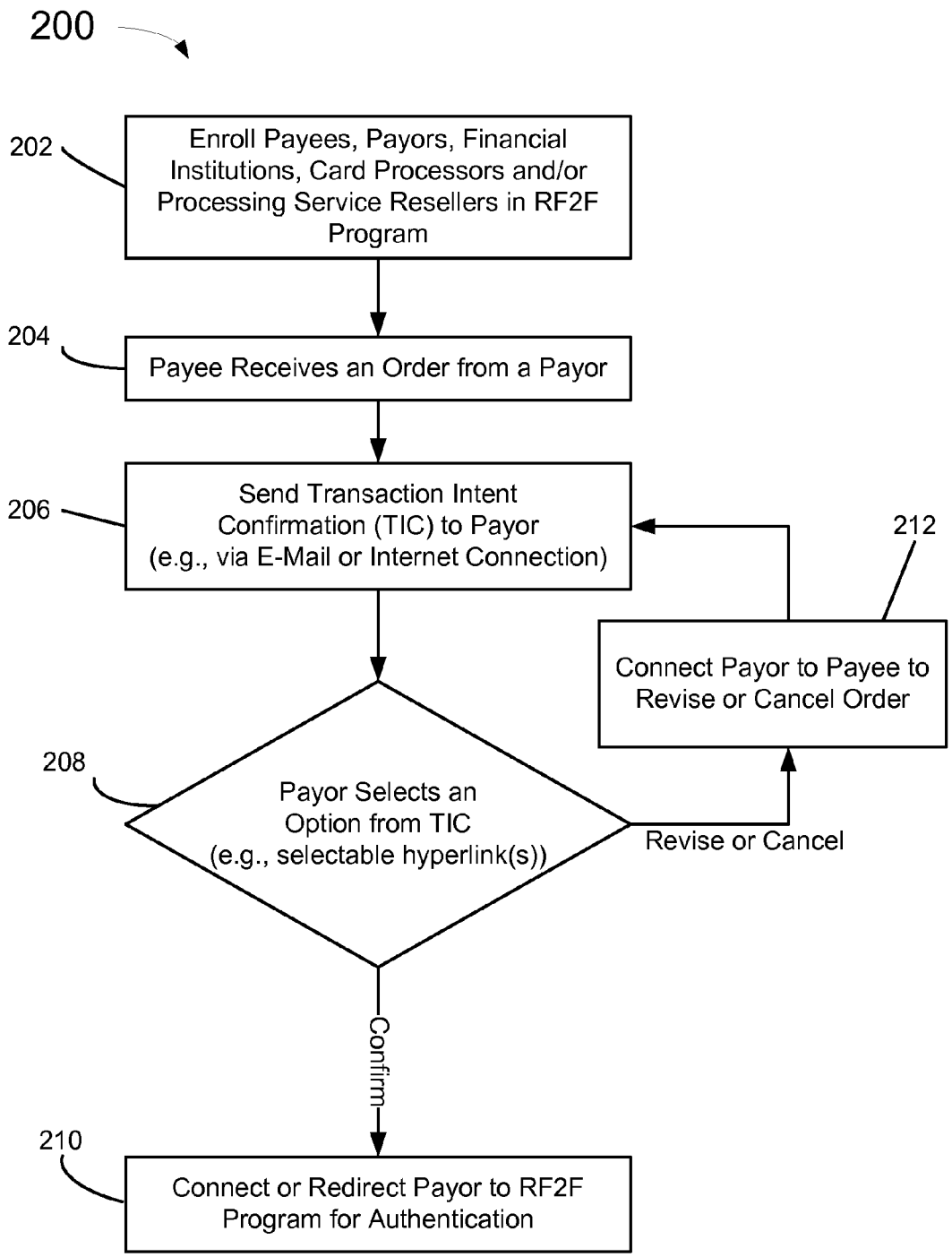
FIGS. 2A and 2B illustrate a process flowchart of an exemplary method of processing card-not-present financial transactions as card-present financial transactions
Figure 2B:
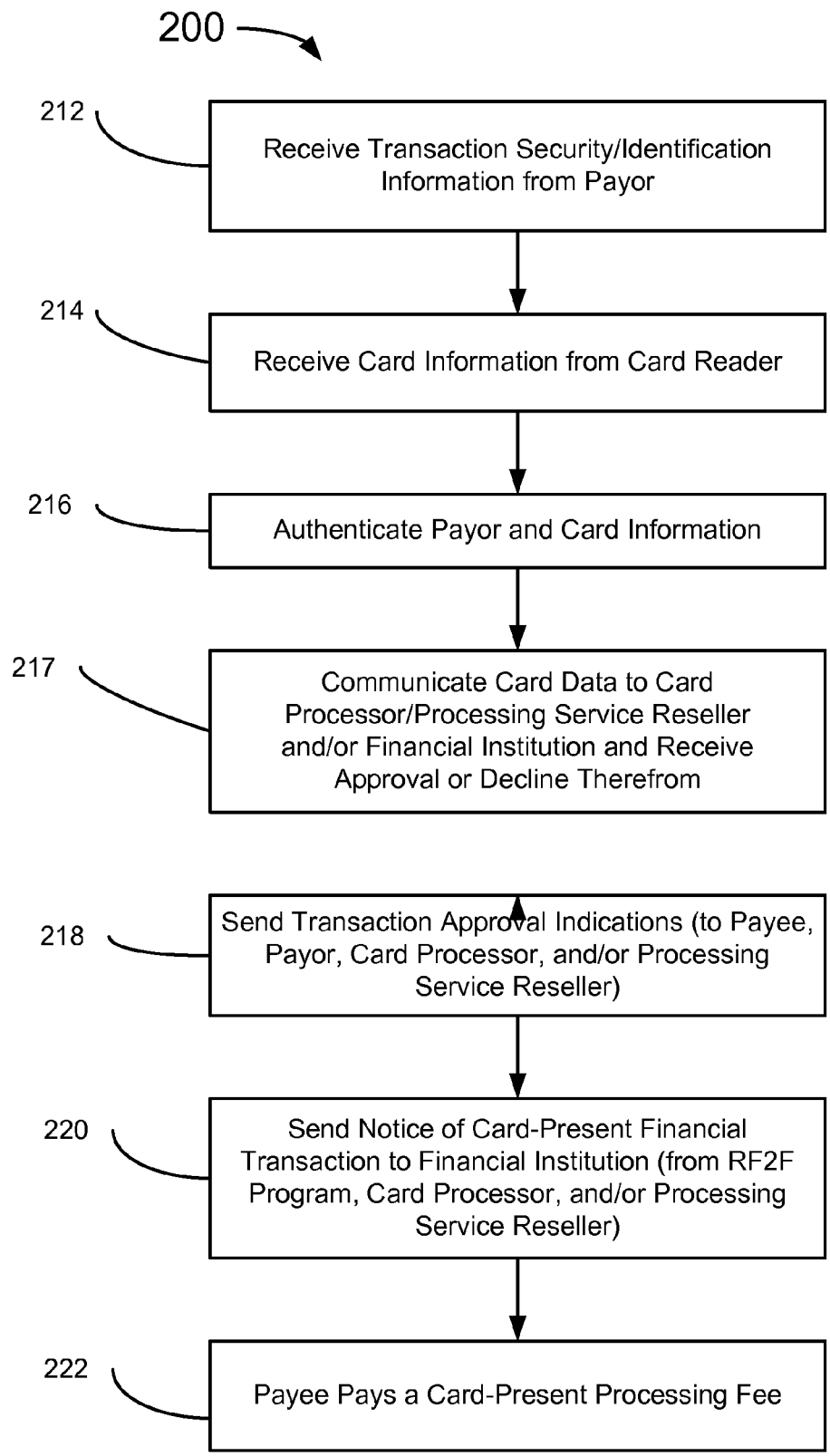

FIGS. 2A and 2B illustrate an exemplary method 200 of conducting a card-not-present financial transaction as a card-present financial transaction.

Figure 3:
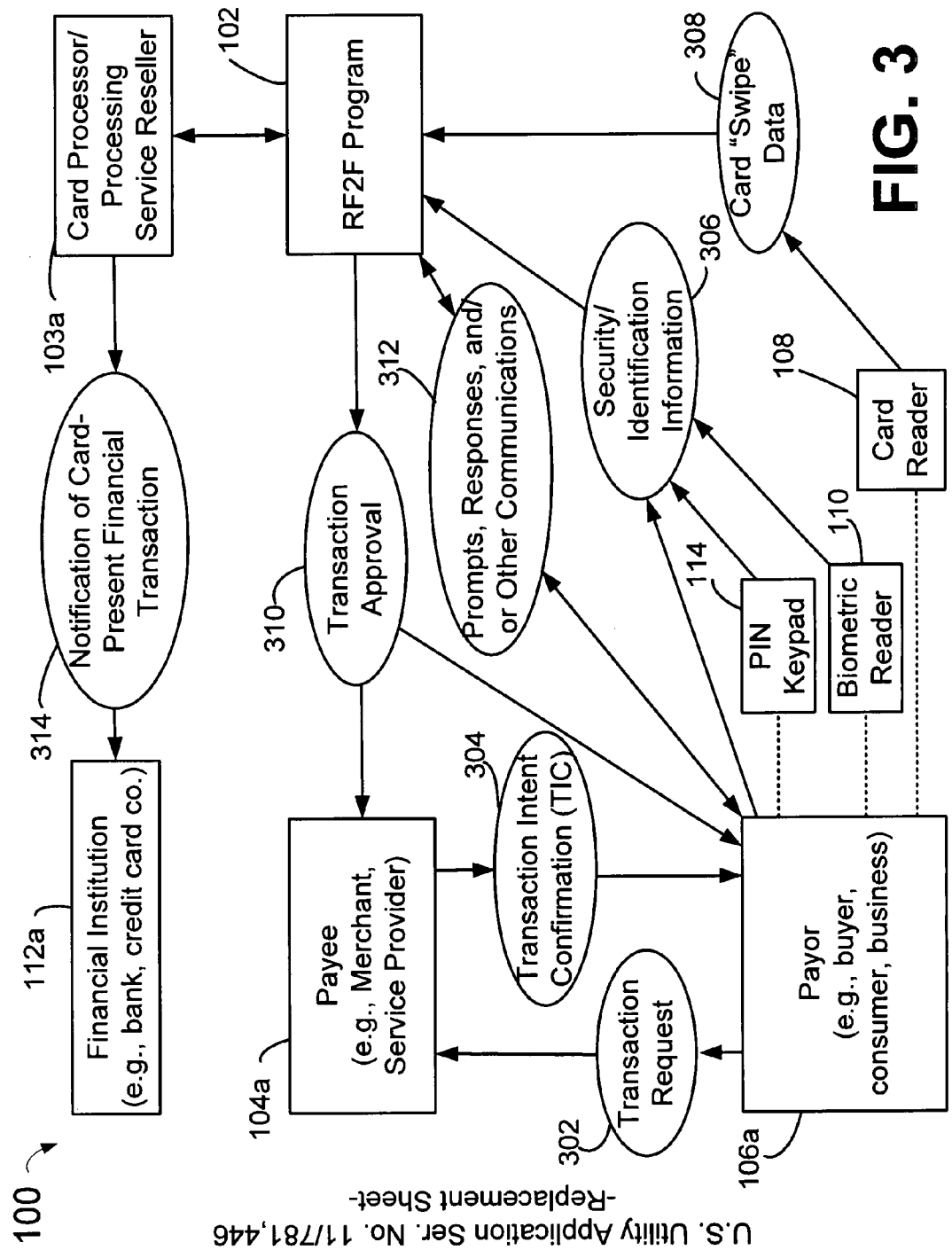
FIG. 3 is another block diagram of the exemplary card processing environment 100, including exemplary information flow.
Figure 4:
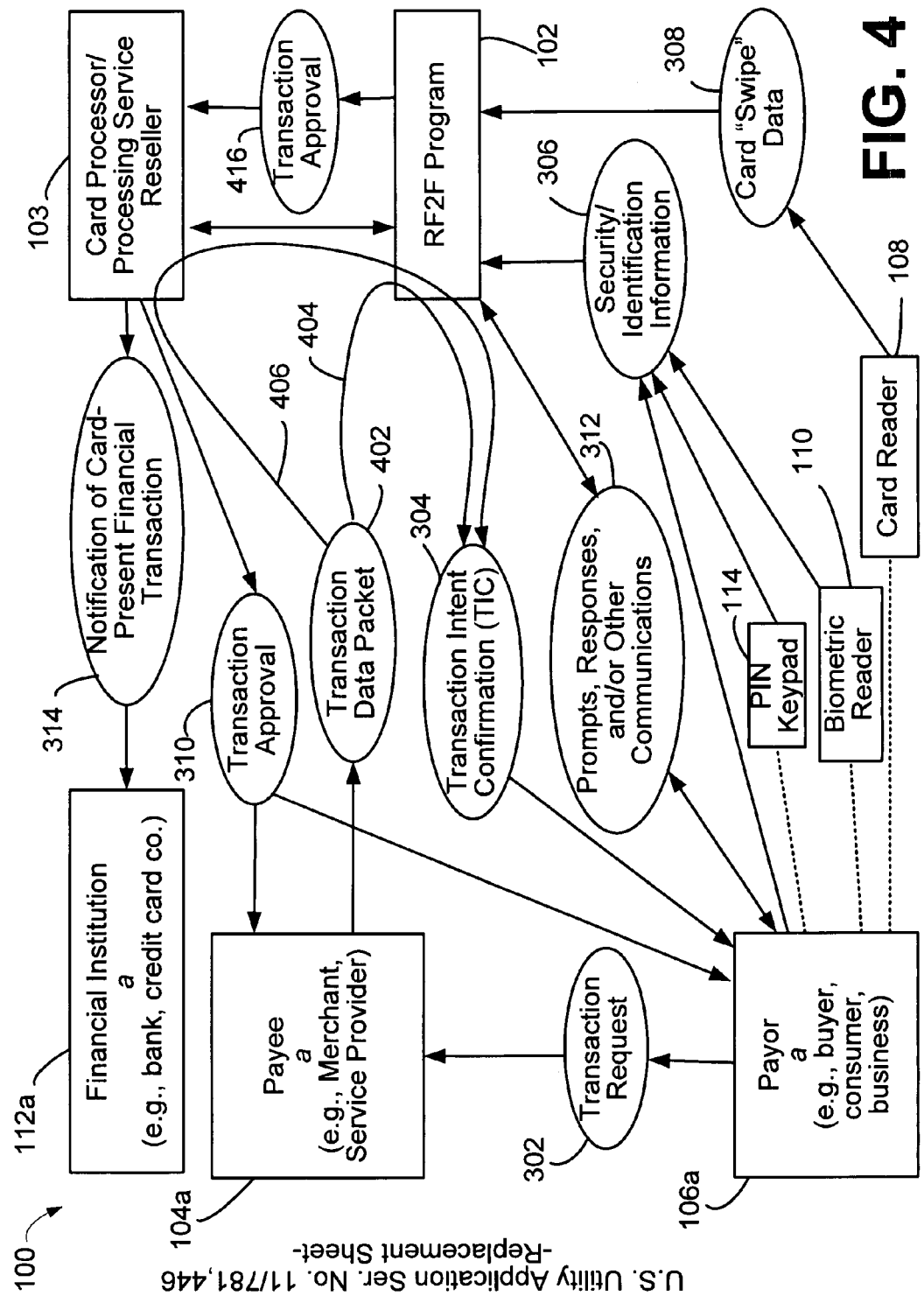
FIG. 4 is another block diagram of the exemplary card processing environment 100, including exemplary information flow.

FIGS. 3 and 4 are block diagrams of the payment card processing environment 100, as illustrated in FIG. 1, including exemplary information flow during a payment card transaction. Information flow can be in the form of voice, text, and/or data objects or data packets, communicated over a telephone line, Internet connection, or other wired, wireless, and/or optical communication medium or network.

The method 200 is described below with reference to the block diagrams of FIGS. 1, 3, and 4. The method 200 is not, however, limited to the example embodiments of FIGS. 1, 3, and 4. Based on the description herein, one skilled in the relevant art(s) will understand that the method 200 can be implemented in other embodiments.

The process begins with an enrollment/registration process 202 in which information is gathered from payee(s) 104, payor(s) 106, card processor(s) 103., and/or financial institutions 112 Enrollment information is typically stored in a database or other storage system associated with RF2F program/system 102. Alternatively, enrollment information, or portions thereof, can be stored at payee 104, payor 106, and/or card processor 103, in which case the information can be provided to RF2F program/system 102 as needed during transactions.

Payees 104 generally enroll through card processor 103 in advance of initiation of payment card transactions with payors 106. Payee enrollment information can include business and individual user identification information, and account information for financial accounts between payees 104, card processor 103 and financial institutions 112.

Payors 106 can enroll in advance of or during a payment card transaction, such as upon prompting by payee 104, card processor 103, and/or RF2F program/system 102. Payor enrollment information can include, for example and without limitation, personal identification information, such as: name; address; and birth date; selection of security questions; answers to security questions; selection of Site Key, selection of one or more personal identification numbers ("PINS") or passwords; biometric information and account information for one or more payment card accounts associated with payors 106 and financial institutions 112.

As part of the enrollment/registration process 202, RF2F program/system 102 optionally provides one or more data objects to payees 104 and/or payors 106, directly and/or through card processor 103. The data objects include data and/or computer executable code. The data objects can be in the form of, for example and without limitation, hyperlinks, interfaces, including graphical user interfaces and/or application programming interfaces (APIs), cookies, applets, keys, encryption data and/or code, picture files and/or video files. The data objects can be used for establishing communication links, security, and/or personal and/or account identification functions.

For example, and without limitation, payees 104 are optionally provided with computer executable code and/or one or more hyperlinks to RF2F program/system 102 and/or card processor 103, and/or otherwise configured to interface with RF2F program/system 102 and/or card processor 103 and/or to communicate with payors 106 through RF2F program/system 102 and/or card processor 103, in which RF2F program/system 102 and/or card processor 103 is used as a gateway.

The data objects can be configured to be automatically or manually initiated, activated, and/or retrieved when a payment card transaction is initiated or during the course of a transaction between any combination of payees 106, payors 104, RF2F program/system 102, and card processor 103.

An exemplary transaction is now described with reference to blocks and information flow illustrated in FIGS. 1, 3, and 4.

At step 204, a payee 104 receives an order or transaction request 302 from a payor 106. Transaction request 302 can include, for example, a request to purchase a product or service from payee 104.

Transaction request 302 can be provided by voice over telephone or other network, by text via facsimile, electronic mail, or text message (e.g., instant messaging or SMS), or through a graphical user interface, such as over the Internet or other network.

Transaction request 302 typically includes an identification of the payor and a payment amount associated with the financial transaction. For example, where payor 106 communicates with payee 104 through an Internet connection, payor 106 optionally directs a computer to an Internet site associated with payee 104. Payor 106 can then select a product or service from a list of offerings available on the Internet site. The purchase process or "check-out" as it is commonly referred to typically requires payor 106 to provide a user identification and password, which serve to identify payor 106. Alternatively, payor 106 provides an electronic mail address, network address, or an identification code obtained during enrollment/registration process 202. Optionally, a data object provided to payor 106 during enrollment/registration process 202, is called or activated when payor 106 sends transaction request 302, wherein the data object provides identification information to payee 104.

At step 206, a transaction intent confirmation ("TIC") 304 is sent to payor 106. TIC 304 is typically a data object configured to direct payor 106 to RF2F program/system 102, or to establish communication between payor 106 and RF2F program/system 102, directly or through card processor 103. TIC 304 can be configured to comply with rules, requirements, and/or restrictions of financial institutions 112, card processors 103, and/or payees 104. In the example of FIG. 3, TIC 304 is generated by payee 104 and sent directly to payor 106. Alternatively, RF2F program/system and/or card processor 103 are involved in sending and/or generating TIC 304. For example, in FIG. 4, payee 104 sends a transaction data packet 402 to card processor 103, as indicated by 406, and/or to RF2F program/system 102, as indicated by 404. Card processor 103 and/or RF2F program/system 102 then generate TIC 304 and send it to payor 106. Transaction data packet 402 can be sent, for example, as information provided by payee 104 through a graphical user interface ("GUI") hosted by RF2F program/system card processor 103 and accessible to payee 104 through an Internet portal.

In an embodiment, TIC 304 is, or includes an electronic mail message with a textual description of the proposed transaction and a prompt for payor 106 to accept or continue the transaction. The prompt can be in the form of a selectable hyperlink to RF2F program/system 102, labeled, for example, "accept" or "continue."

The hyperlink can be to a unique uniform resource locator ("URL") of RF2F program/system 102, dedicated to or generated for the particular transaction, and having access to the transaction details. Alternatively, the hyperlink can be to a general URL of RF2F program/system 102, wherein upon or after selection of the hyperlink, additional information is provided to RF2F program/system 102 to allow RF2F program/system 102 to associate payor 106 with the transaction details.

The electronic mail message optionally includes a hyperlink to payee 104, labeled, for example, "cancel order" or "revise order." The hyperlink to payee 104 can link to a unique URL of payee 104, dedicated to or generated for the particular transaction, or a general URL of payee 104.

Alternatively, TIC 304 is sent via a GUI that presents content similar to that described above with respect to electronic mail messages. The GUI can be generated, presented, or hosted by payee 104, RF2F program/system 102, and/or card processor 103, or can be generated, at least in part, by code resident at payor 106 that was provided during enrollment.

TIC 304 optionally includes a prompt for payor 106 to enroll into the RF2F program/system with RF2F program/system 102. The prompt can be in the form of a selectable hyperlink to RF2F program/system 102.

At step 208, payor 106 is presented with prompts to confirm or continue the transaction, or to revise or cancel the transaction. When payor 106 selects to revise or cancel the transaction, processing proceeds to step 212, where payor 106 is connected to payee 104 to revise or cancel the transaction. Alternatively, when payor 106 selects to cancel the transaction, processing can terminate. When payor 106 selects to continue with the transaction, processing proceeds to step 210.

At step 210, payor 106 is connected to RF2F program/system 102 as described above. Once connected, RF2F program/system 102 and payor 106 send prompts, responses and/or other communications 312 to one another.

At step 212 (FIG. 2B), RF2F program/system 102 receives security/identification information 306. Security/identification information 306 can include, for example and without limitation, personal identification information, password(s), PIN(s), biometric information, and/or account selection/identification information. Security/identification information 306, or a portion thereof, may be sent to RF2F program/system 102 under control of a user at payor 106, following a prompt from RF2F program/system 102. Multiple users can conduct payment card transactions at a given payor 106. Each additional user associated with a given payor 106 would be enrolled into the RF2F program/system in the same manner as payor 106. Alternatively, or additionally, security/identification information 306, or a portion thereof, is sent to RF2F program/system 102 without input from a user at payor 106, following a computer readable prompt from RF2F program/system 102 that initiates computer readable code resident at payor 106, such as a cookie, applet, or other code, sent to payor 106 during the registration process.

At step 214, RF2F program/system 102 receives payment card information (e.g., card swipe data) 308 from card reader 108. Step 214 typically follows a prompt from RF2F program/system 102 and/or payee 104 to payor 106 to provide or swipe a payment card through card reader 108.

At step 216, RF2F program/system 102 authenticates payor 106 and card information 308. This includes comparing security/identification information 306 with information provided during enrollment of payor 106, and optionally includes confirmation and/or authorization from an associated financial institution 112 and/or a card processor 103.

At step 217, card data is communicated to card processor/processing service reseller 103 and/or financial institution 112, and an approval or decline is returned therefrom. The communicated card data can include, without limitation, card swipe data 308, security/identification information 306, responses 312, transaction data packet 402, and/or information obtained during enrollment, or portions thereof.

At step 218, upon successful authentication of payor 106 and card information 308, and receipt of approval from financial institution 112 and/or card processor 103, a transaction approval/decline indication 310 is sent to payee 104 and payor 106. In the example of FIG. 3, transaction approval/decline indication 310 is sent from RF2F program/system 102. In the example of FIG. 4, transaction approval/decline indication 310 is sent from card processor 103 in response to a transaction approval indication 316 from RF2F program/system. Different transaction approval/decline indications 310 can be sent to payee 104 and payor 106. The transaction approval/decline indication 310 sent to payor 106 can be sent from payee 104.

At step 220, financial institution 112 receives a notification 314 of the payment card transaction, indicating that the transaction was conducted as a card-present transaction with an authenticated payor 106. The notification 314 is can be sent from card processor 103, as illustrated in FIG. 3, or can be sent from RF2F program/system 102, and/or payee 104, depending upon rules associated with financial institution 112.

At step 222, financial institution 112 and/or card processor 103 debits an account of payee 104 or otherwise charges or invoices payee 104 for a processing fee (e.g., discount fee and/or transaction fee). The processing fee can be equal to or similar to a card-present processing fee, or lower than a typical processing fee for an otherwise similar transaction conducted as a card-not present financial transaction.

Financial institution 112 also posts the transaction for payment to the corresponding account of payor 106 for the amount of the financial transaction, and credits an account of payee 104 in the amount of the financial transaction.

3. Business Methods

Financial institutions, card processors, merchants, and purchaser/card holders all suffer in some respect from fraudulent payment card transactions. Financial institutions and/or card processors suffer direct financial harm when goods or services are fraudulently obtained from merchants payees, because the authorizing financial institution and/or card processor and or merchant/service provider must, in many cases, credit the payor/consumer for the fraudulent transaction. Merchants suffer directly in the form of higher processing fees charged by financial institutions and card processors as a result of card processing related fraud and the resultant charge-back of funds taken from them and given back to the payor/consumer whose card was used in a fraudulent manner. Merchants are also subject to an ever growing, evolving and stringent list of rules and regulations published by the Payment Card Industry Security Standards Council (PCISSC) as put forth in the Payment Card Industry Data Security Standard (PCIDSS). Heavy fines and penalties are passed down to the merchant who is determined to be at fault in a card data breach. Purchaser/card holders or consumers suffer indirectly when the costs of card fraud are passed along to consumers through higher costs for goods and services and directly suffer the financial and mental hardship of dealing with the fraudulent use and theft of their own financial instrument data.

Financial institutions, card processors, merchants, and buyers thus all have incentive to participate in a remote face-to-face ("RF2F") program.

Disclosed below are methods and systems for further promoting and/or encouraging participation in a RF2F program/system.

Financial institutions 112 and/or card processor 103 can use money saved from reduced fraud to promote and/or encourage payees 104 and/or payors 106 to enroll in one or more RF2F program/systems.

For example, financial institutions 112 and/or card processor(s) 102 can charge lower processing fees to payees 104 when payees 104 conduct payment card transactions through a RF2F program/system, rather than as conventional card-not-present transactions. Processing fees can be equal to or similar to those charged for conventional card-present financial transactions.

Processing fees are optionally negotiated between card processor 103, financial institutions 112, payees 104, and/or combinations thereof.

Financial institutions 112 and/or multiple card processors 103 can compete with financial institutions card processors, respectively, based at least in part on participation in a RF2F program/system, and based on their respective RF2F processing fees.

Payees 104 can, in turn, reduce costs for goods and/or services.

Payees 104 and/or financial institutions 112 optionally promote enrollment into RF2F program/system(s) by payors 106 through rewards programs, such as financial credit for future transactions, cash back, or other promotions or special offers. The rewards programs can be funded with savings described above.

4. Conclusion

The present invention has been described above with the aid of functional building blocks illustrating the performance of functions and relationships thereof. At least some of the boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor, and thus, are not intended to limit the present invention and the appended claims in any way.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
receiving a purchase request and an indication of a corresponding requestor at a merchant computer system;
initiating, at the merchant computer system, an electronic mail message to an electronic mail address associated with the requestor in response to the purchase request, wherein the electronic mail message includes a textual description of the purchase request and a first computer readable link to a first network address of a card processor computer system, and wherein the first computer readable link is configured to be displayed at by a requestor computer system as a first requestor-selectable link within the electronic mail message; and
receiving an authorization indication at the merchant computer system from the card processor computer system that the purchase request is approved as a card-present financial transaction;
wherein the receiving the purchase request, the initiating of the electronic mail message, and the receiving of the authorization indication are performed in a suitably programmed merchant computer system.

2. The method according to claim 1, wherein the card processor computer system is configured to communicate with the requestor computer system over a network connection in response to requestor activation of the computer readable link, to authenticate an identity of the requestor at least in part over the network connection, to receive information from a card reader located physically proximate to the requestor, and to authorize the purchase request as a card-present financial transaction.

3. The method according to claim 1, wherein the electronic mail message includes a second computer readable link to a network address associated with the merchant computer system configured to be displayed at the requestor computer system as a second requestor-selectable link within the electronic mail message.

4. The method according to claim 3, further including, permitting the requestor to revise the purchase request at the merchant computer system through the second computer readable link to the merchant computer system.

5. The method according to claim 3, further including, permitting the requestor to cancel the purchase request at the merchant computer system through the second computer readable link to the merchant computer system.

6. The method according to claim 1, wherein the electronic mail message includes a second computer readable link to a second network address associated with the card processor computer system to permit the requestor to enroll with the card processor computer system.

7. The method according to claim 1, wherein the initiating of the electronic mail message includes sending the electronic mail message from the merchant computer system to the electronic mail address associated with the requestor.

8. The method according to claim 1, wherein the initiating of the electronic mail message includes sending a transaction data packet corresponding to the purchase request from the merchant computer system to the card processor computer system, wherein the card processor computer system is configured to send the electronic mail message to the electronic mail address associated with the requestor in response to the transaction data packet.

9. A system, comprising:
a merchant computer system configured to receive a purchase request and an indication of a corresponding requestor, to initiate an electronic mail message to an electronic mail address associated with the requestor in response to the purchase request, and to receive an authorization indication from the card processor computer system that the purchase request is approved;
wherein the electronic mail message includes a textual description of the purchase request and a first computer readable link to a network address of a card processor computer system, and wherein the first computer readable link is configured to be displayed at the requestor computer system as a first requestor-selectable link within the electronic mail message.

10. The system of claim 9, wherein the card processor computer system is configured to communicate with the requestor computer system over a network connection in response to requestor activation of the first computer readable link, to authenticate an identity of the requestor at least in part over the network connection, to receive information from a card reader located physically proximate to the requestor, and to authorize the purchase request as a card-present financial transaction.

11. The system of claim 9, wherein the merchant computer system is configured to provide a second computer readable link to a network address associated with the merchant computer system with the electronic mail message, and wherein the second computer readable link is configured to be displayed at the requestor computer system as a second requestor-selectable link within the electronic mail message.

12. The system of claim 11, wherein the merchant computer system is configured to permit the requestor to revise the purchase order through the second computer readable link to the network address associated with the merchant computer system.

13. The system of claim 11, wherein the merchant computer system is configured to permit the requestor to cancel the purchase order through the second computer readable link to the network address associated with the merchant computer system.

14. The system of claim 9, wherein the merchant computer system is configured to provide a second computer readable link to a second network address associated with the card processor computer system with the electronic mail message, to permit the requestor to enroll with the card processor computer system.

15. The system of claim 9, wherein the merchant computer system is configured to send the electronic mail message from merchant computer system to the electronic mail address associated with the requestor.

16. The system of claim 9, wherein the merchant computer system is configured to send a transaction data packet corresponding to the purchase request to the card processor computer system, and wherein the card processor computer system is configured to send the electronic mail message to the electronic mail address associated with the requestor in response to the transaction data packet.

* * * * *